(12) United States Patent
Clack et al.

(10) Patent No.: US 12,458,946 B2
(45) Date of Patent: Nov. 4, 2025

(54) COMPOUND ANNULAR NON-THERMAL PLASMA REACTOR CORE

(71) Applicant: THE REGENTS OF THE UNIVERSITY OF MICHIGAN, Ann Arbor, MI (US)

(72) Inventors: Herek L. Clack, Ann Arbor, MI (US); Kevin D. Melotti, Ypsilanti, MI (US)

(73) Assignee: The Regents of The University of Michigan, Ann Arbor, MI (US)

( * ) Notice: Subject to any disclaimer, the term of this patent is extended or adjusted under 35 U.S.C. 154(b) by 908 days.

(21) Appl. No.: 17/635,864

(22) PCT Filed: Aug. 21, 2020

(86) PCT No.: PCT/US2020/047295
§ 371 (c)(1),
(2) Date: Feb. 16, 2022

(87) PCT Pub. No.: WO2021/071594
PCT Pub. Date: Apr. 15, 2021

(65) Prior Publication Data
US 2022/0288552 A1 Sep. 15, 2022

Related U.S. Application Data

(60) Provisional application No. 62/889,732, filed on Aug. 21, 2019.

(51) Int. Cl.
*B01J 19/08* (2006.01)

(52) U.S. Cl.
CPC ...... *B01J 19/088* (2013.01); *B01J 2219/0809* (2013.01); *B01J 2219/0826* (2013.01);
(Continued)

(58) Field of Classification Search
CPC .............. B01J 19/088; B01J 2219/0809; B01J 2219/0826; B01J 2219/0875;
(Continued)

(56) References Cited

U.S. PATENT DOCUMENTS

| 7,067,092 | B2 | 6/2006 | Hall et al. | |
| 2004/0022701 | A1* | 2/2004 | Segal | B01J 35/19 422/186.04 |

(Continued)

FOREIGN PATENT DOCUMENTS

| CN | 1269734 A | 10/2000 |
| CN | 1578680 A | 2/2005 |

(Continued)

OTHER PUBLICATIONS

Chinese Office Action regarding Patent Application No. 202080059111.3, dated Jan. 15, 2024.

(Continued)

*Primary Examiner* — Xiuyu Tai
(74) *Attorney, Agent, or Firm* — Harness, Dickey & Pierce, P.L.C.

(57) ABSTRACT

A non-thermal plasma reactor system having an outer member; a non-thermal plasma inner member sleeve disposed within the outer member, the non-thermal plasma inner member sleeve having an central core volume, the non-thermal plasma inner member sleeve being smaller than the outer member to define an annular volume there between, the non-thermal plasma inner member sleeve having an inner surface boundary and an outer surface boundary to define a sleeve volume there between, the inner surface boundary and the outer surface boundary being permeable and configured to permit airflow between the annular volume and the central core volume; dielectric material being disposed within the sleeve volume; and at least one electrode (Continued)

Figure 1A:
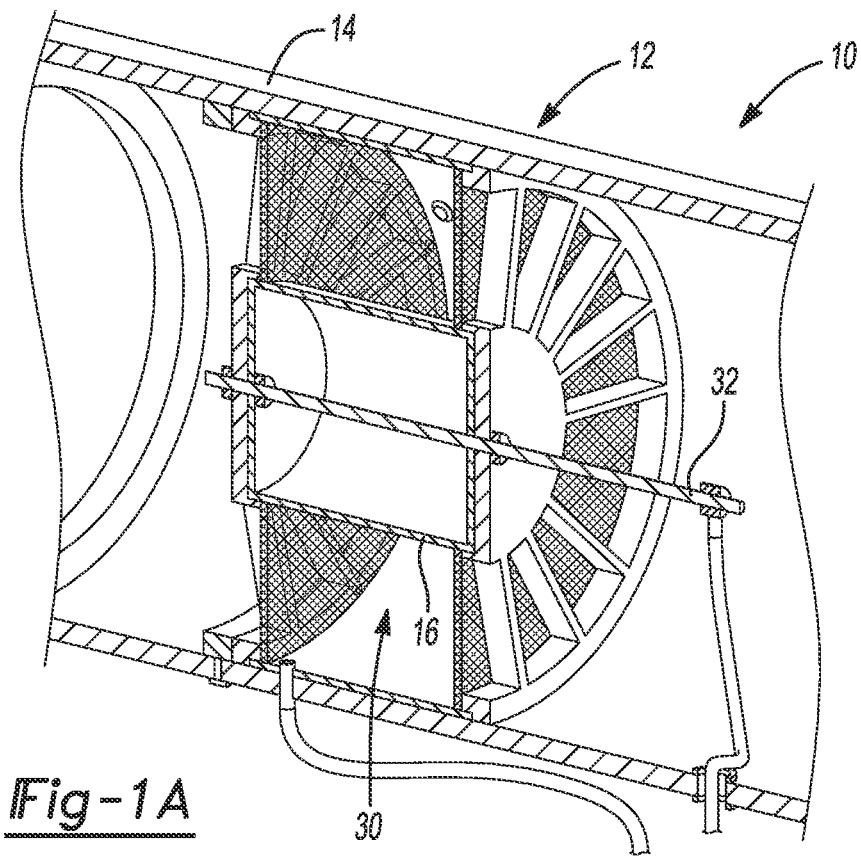

extending within the sleeve volume and another electrode coupled to the inner sleeve member generating the non-thermal plasma contacting the airflow as it flows between the annular volume and the central core volume.

10 Claims, 3 Drawing Sheets

(52) U.S. Cl.
CPC .................. *B01J 2219/0875* (2013.01); *B01J 2219/0896* (2013.01)

(58) Field of Classification Search
CPC .. B01J 2219/0896; B01J 35/19; B01J 8/0214; B01J 2523/00; B01J 2523/13; B01J 2523/17; B01J 2523/55; B01J 2523/24; B01J 2523/25; B01J 2523/67; B01J 2523/3706; B01J 2523/842; B01J 2523/845; B01J 2523/15; B01J 2523/847; B01J 2523/14; B01J 2523/72; B01J 2219/083; B01J 2219/0886; B01J 23/22; B01J 23/8472; B01J 8/0257; B01J 23/002; B01J 8/0415; B01J 2219/0892; B01J 2219/1943; B01J 2219/0894; F01N 3/0892; F01N 13/0097; F01N 2240/28; F01N 3/01; F01N 3/2882; F01N 2570/14; B01D 53/9454; B01D 53/945; B01D 2259/818; Y02A 50/20; Y02T 10/12
See application file for complete search history.

(56) References Cited

U.S. PATENT DOCUMENTS

| | | |
|---|---|---|
| 2004/0219084 A1 | 11/2004 | Hall et al. |
| 2009/0044661 A1 | 2/2009 | Li et al. |
| 2014/0294681 A1 | 10/2014 | Mole |

FOREIGN PATENT DOCUMENTS

| | | |
|---|---|---|
| CN | 101534930 A | 9/2009 |
| JP | 2000-348848 A | 12/2000 |
| JP | 2001-515779 A | 9/2001 |
| JP | 2002-519166 A | 7/2002 |
| JP | 2003-190774 A | 7/2003 |
| JP | 2003-522873 A | 7/2003 |
| JP | 2004-506849 A | 3/2004 |
| JP | 2005-23913 A | 1/2005 |
| JP | 2008-178870 A | 8/2008 |
| JP | 2009-190007 A | 8/2009 |
| JP | 2015-506054 A | 2/2015 |
| KR | 10200030267 A | 6/2000 |
| KR | 10-2009-0124201 A | 12/2009 |
| KR | 10-2014-0107311 A | 9/2014 |
| KR | 2016-0057207 A | 5/2016 |
| WO | WO-99-12638 A1 | 3/1999 |

OTHER PUBLICATIONS

Extended Eurpoean Search Report regarding Application No. EP 20874167.8, mailed Jun. 2, 2023.
International Search Report and Written Opinion Regarding International Application No. PCT/US2020/047295, mailed Apr. 27, 2021.
European Office Action regarding Application No. 208741678, mailed Feb. 11, 2025.
Japanese Office Action regarding Application No. 2022-510965, dated Aug. 16, 2024.
T. Xia et al., "Field Operations of a Pilot Scale Packed-bed Non-thermal Plasma (NTP) Reactor Installed at a Pig Barn on a Michigan Farm to Inactivate Airborne Viruses", Oct. 2019.
Korean Office Action regarding Application No. 1020227008559, dated Jul. 31, 2025.

* cited by examiner

COMPOUND ANNULAR NON-THERMAL PLASMA REACTOR CORE

CROSS-REFERENCE TO RELATED APPLICATION

This application is a 371 U.S. National Phase of International Application PCT/US2020/047295, filed on Aug. 21, 2020, which claims the benefit of U.S. Provisional Application No. 62/889,732, filed on Aug. 21, 2019. The entire disclosures of the above applications are incorporated herein by reference.

FIELD

The present disclosure relates to non-thermal plasma systems and, more particularly, relates to a compound annular non-thermal plasma reactor core that is particularly well adapted for destruction of chemical contaminants and/or inactivation of biological pathogens present in flowing liquids or gases.

BACKGROUND AND SUMMARY

This section provides background information related to the present disclosure which is not necessarily prior art. This section provides a general summary of the disclosure, and is not a comprehensive disclosure of its full scope of all of its features.

Increasing public concern over disease outbreaks has heightened the public's interest in how infectious agents are transmitted and what health-protective measures can be used against transmission. That is, chemical contaminants and biological pathogens in air likely raise the level of public concern because they are unseen, thereby increasing public concern when health impacts are severe or when sources are diffuse, unidentifiable, and/or uncontrolled. Approximately 75% of acute illnesses in the developed world are respiratory, and nearly 80% of these illnesses are caused by viruses that are often transmitted in indoor environments. A stark example of disease transmission within indoor environments is the 2003 SARS coronavirus outbreak when fecal matter-contaminated aerosols conveyed through the ventilation system were found to be responsible for a large cluster of SARS infections concentrated in the Amoy Gardens high-rise apartment block in Hong Kong. Indoor air quality will continue to increase in importance as global populations continue to grow, city populations continue to swell from rural-to-urban migration patterns, and residential and commercial building occupant densities continue to rise as a result.

However, centralized heating, ventilation, and air conditioning (HVAC) systems are often carefully engineered to compensate for constrictions in the ductwork and obstructions to the air flow. The associated backpressure can require larger air handling systems and motors, thereby increasing the size, energy use, and cost of such HVAC systems. Also, modern centralized HVAC systems recirculate the majority of air that undergoes conditioning with minimal outdoor or fresh air addition. As a result, chemical or biological contaminants released in one indoor space could be transported to another indoor space, the two being connected by the HVAC system.

According to the principles of the present teachings, prevention of the transmission of infective viruses and bacteria through centralized HVAC systems without need for a particulate filter is provided, thereby preventing contamination of indoor environments by external biological agents or transmission of contamination between indoor spaces connected by the building HVAC system. Moreover, according to the principles of the present teachings, such prevention of the transmission of infective viruses and bacteria can be achieved without the associated backpressure experienced in other systems and while maintaining a compact size.

In some embodiments, the present teachings employ one or more electrodes that induce electrical discharges and/or impose an electric field that concurrently charge, remove, and/or render non-infective otherwise infectious aerosols from the air stream. That is, the present teachings, in some embodiments, employ one or more electrodes that induce electrical discharges that initiate a plasma that destroys chemical contaminants and/or inactivates and/or renders non-infective biological pathogens within an air stream. The present teachings further provide a non-thermal plasma system that improves the efficiency of operation of the plasma without the conventional disadvantage of flow restriction. This provides the potential for use in central HVAC systems, or miniaturization into portable or wearable systems, without the energy penalty associated with particulate filters and avoiding a substantial pressure differential across the particulate filters.

The present teachings may find utility in a wide variety of applications, including but not limited to HVAC systems, sterile room contaminant control, aircraft and spacecraft cabin environmental control, human and animal bio-security, confined animal operations, personal air cleaner systems, and the like. The present teachings achieve many benefits, including but not limited to being filterless, reduced size and operating costs compared to particulate filters, being tunable, and the ability to achieve EPA recommendations not achievable by today's technology.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1A is a cross-sectional perspective view illustrating an annular design of non-thermal plasma reactor core for air sterilization according to some embodiments of the present teachings.

FIG. 1B is a cross-sectional side view illustrating the annular design of non-thermal plasma reactor core for air sterilization according to some embodiments of the present teachings.

FIG. 2A is a cross-sectional perspective view illustrating a compound annular non-thermal plasma reactor core showing initially annular airflow transitioning to a pipe flow after passing through an annular NTP reactor core according to some embodiments of the present teachings.

FIG. 2B is an enlarged cross-sectional side view illustrating the compound annular non-thermal plasma reactor core showing initially annular airflow transitioning to a pipe flow after passing through an annular NTP reactor core according to some embodiments of the present teachings.

FIG. 3 is a top perspective view illustrating an exemplary compound annular non-thermal plasma reactor core with an open chamber revealed to illustrate the electrodes and dielectric beads according to some embodiments of the present teachings.

Figure 2A:
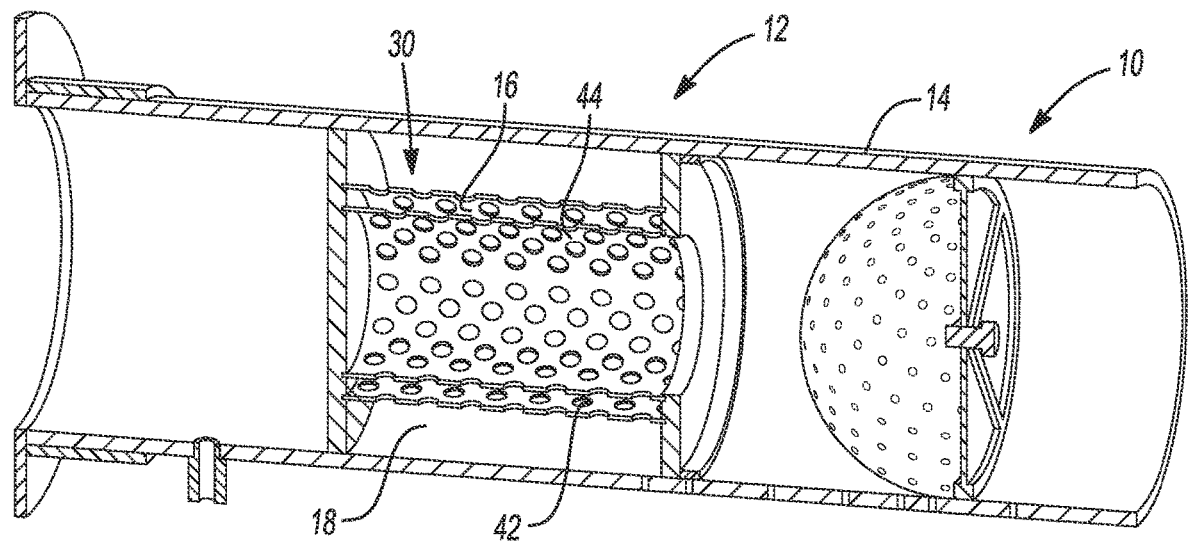
Figure 2B:
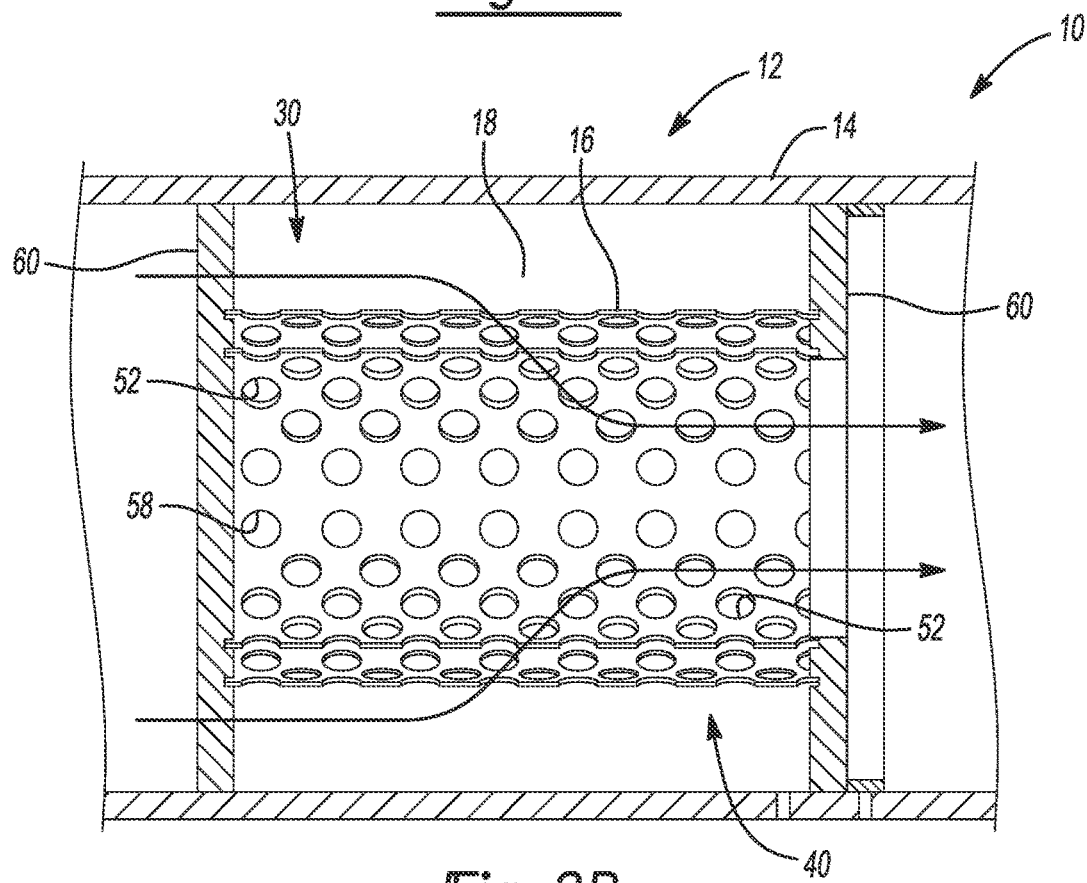
Figure 3:
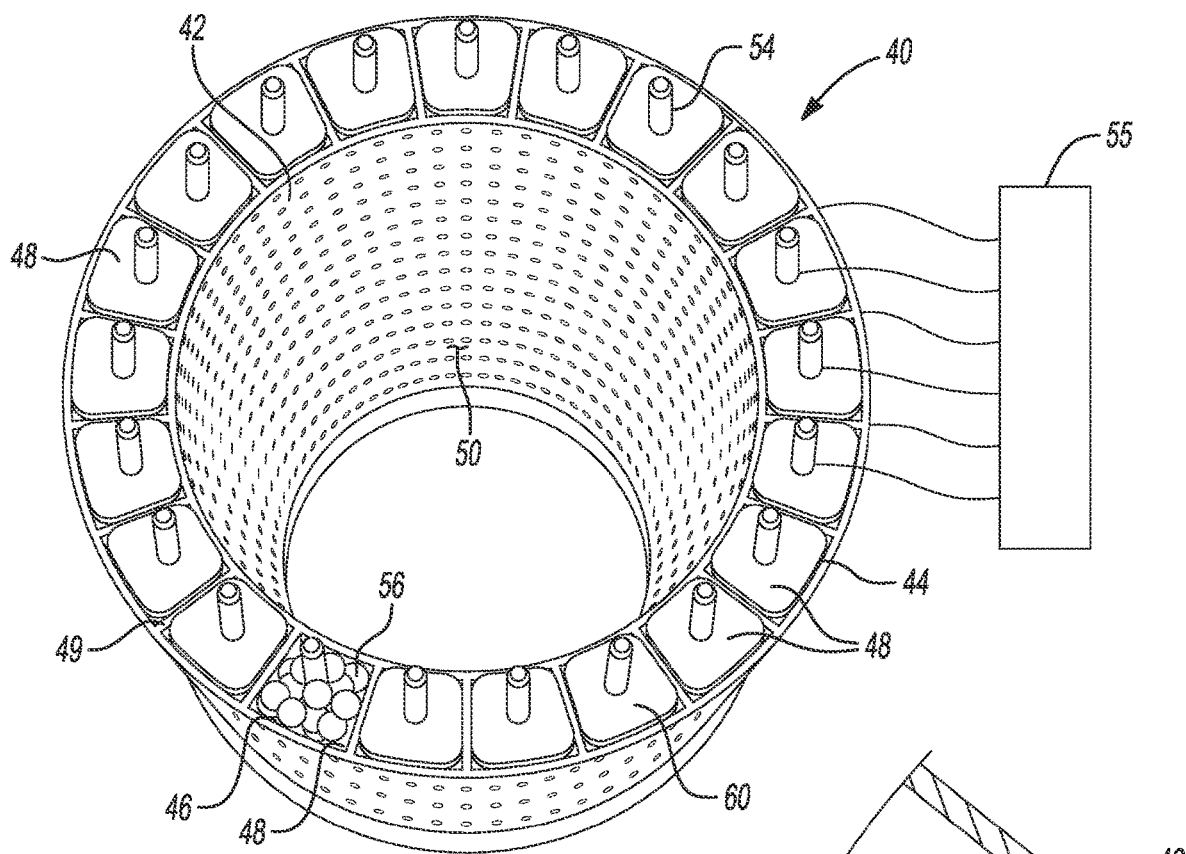
Figure 4:
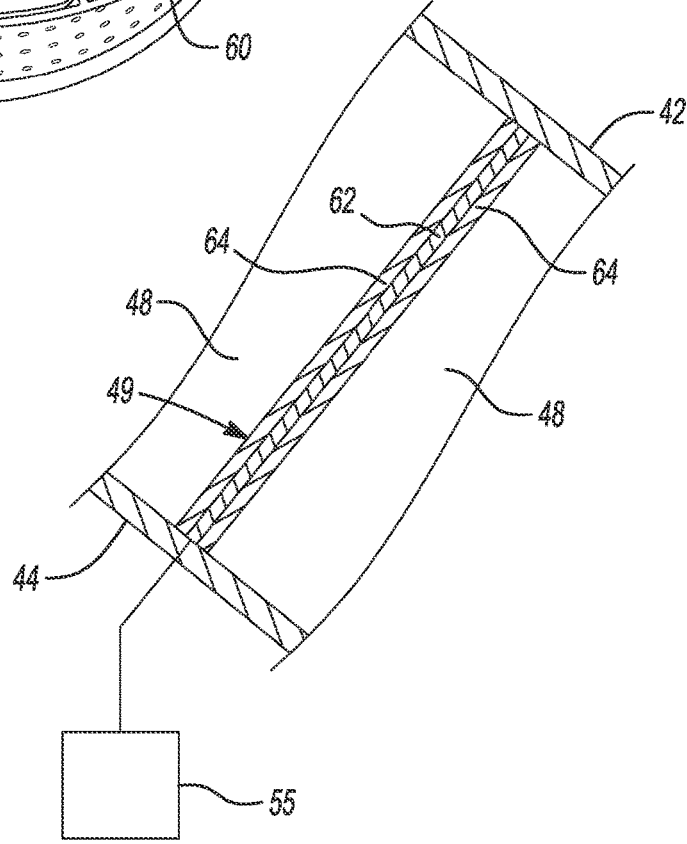

FIG. 4 is a partial cross-sectional view illustrating a chamber wall and associated electrode and dielectric layers of the embodiment of FIGS. 2A-3.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

According to the principles of the present teachings, as illustrated in the accompanying figures, a non-thermal plasma (NTP) reactor system 10 is provided for exposing an airflow within a nested passage assembly 12 to a non-thermal plasma. More particularly, in some embodiments, the nested passage assembly 12 of the non-thermal plasma (NTP) reactor system 10 can comprise an outer member 14 and an inner member 16 nested within the outer member 14. Accordingly, inner member 16 can have a smaller cross-sectional area compared to the outer member 14 to permit the outer member 14 to fully contain the inner member 16 along a longitudinal direction. In some embodiments, the outer member 14 and the inner member 16 can each be cylindrically shaped and arranged in a coaxial relationship. However, it should be understood that the principles of the present teachings are equally applicable to configurations wherein outer member 14 and inner member 16 have similar and/or dissimilar cross-sectional shapes. That is, by way of non-limiting example, outer member 14 and inner member 16 can each define a similar cross-sectional shape, such as an oval, oblong, square, rectangular, or any other conducive cross-sectional shape. Likewise, outer member 14 and inner member 16 can each define dissimilar cross-sectional shapes or profiles to facilitate airflow and exposure to the non-thermal plasma as described herein.

Accordingly, in some embodiments, outer member 14 and inner member 16 can define a cylindrical shape such that inner member 16 has a radius or diameter that is less than a radius or diameter of outer member 14, such that an annular volume 18 exists between outer member 14 and inner member 16. In this arrangement, inner member 16 can be nested within outer member 14 such that outer member 14 completely encompasses inner member 16 from a cross-sectional perspective. In some embodiments, inner member 16 can be coaxial with outer member 14 such that annular volume 18 is equidistant and/or equally-sized radially between outer member 14 and inner member 16.

Figure 1B:
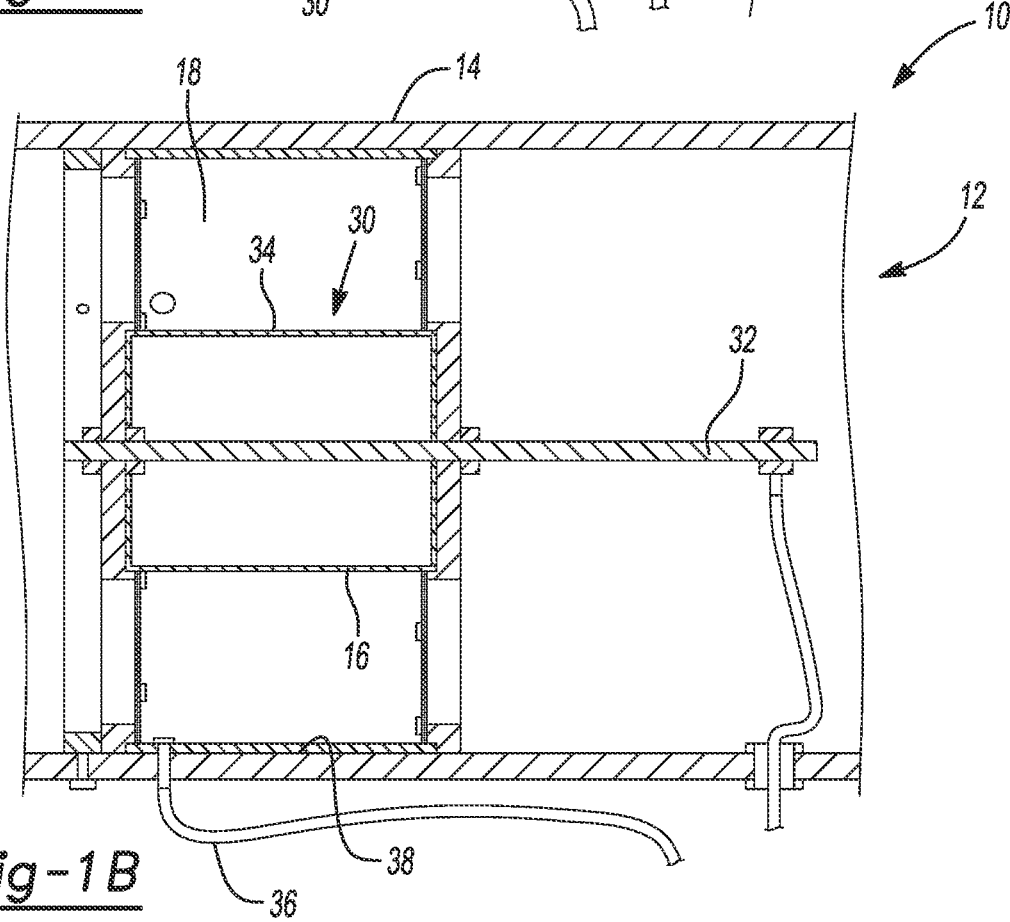

In some embodiments, as illustrated in FIGS. 1A and 1B, air flows through annular volume 18 and remains within annular volume 18 as it is exposed to a non-thermal plasma, thereby all exposure of non-thermal plasma occurs in the same annular volume (e.g. annular volume 18) as the airflow. In this embodiment, the airflow remains axial—that is, the air flows in a direction that is parallel to the longitudinal axis of outer member 14 and/or inner member 16.

With continued reference to FIGS. 1A and 1B, in some embodiments, a non-thermal plasma source system 30 can comprise an electrode member 32 and dielectric layer 34 that are formed as inner member 16 to define a singular, integral member. It should be understood that in axial-onlyflow embodiments, the inner member 16 is impermeable. In some embodiments, an opposing electrical ground 36 and dielectric layer 38 can be formed as outer member 14 to define a singular, integral member. An electrical field can be achieved between electrode member 32 and ground 36 to create a non-thermal plasma extending across annular volume 18. As airflow passes axially through annular volume 18, the airflow is exposed to the non-thermal plasma according to the principles of the present teachings.

It should be understood that as the annular distance of annular volume 18 of the embodiment of FIGS. 1A and 1B increases, it may become more difficult to achieve a consistent and uniform non-thermal plasma. Likewise, reduction of this annular distance may improve the performance of the non-thermal plasma; however, this may result in a restriction of the airflow within annular volume 18. In other words, in the embodiment of FIGS. 1A and 1B, the dimension of the annular volume 18 may be constrained by two competing priorities: (i) maximizing the annular cross-section to facilitate fluid flow and minimize differential pressure and (ii) minimizing the annular cross section to maximize the electric field strength and plasma production. It should be understood that a restriction within the airflow can result in an increase in airflow velocity. To properly treat contaminants within a unit of air with a non-thermal plasma, it is generally considered that the airflow should be exposed to the non-thermal plasma for a predetermined amount of time, an amount that varies depending on the specific nature of the contaminant. To this end, if the airflow velocity increases, it may be necessary to extend the length of the non-thermal plasma to ensure the proper plasma exposure period. This may not be a concern in some embodiments and/or applications.

However, in applications where it is desired to improve non-thermal plasma performance without inadvertently causing airflow restrictions and thereby requiring additional flow length, some embodiments as illustrated in FIGS. 2A-3 can comprise a non-thermal plasma inner member sleeve 40 that is formed as inner member 16. In some embodiments, as illustrated in FIG. 3, the inner member sleeve 40 can comprise a generally cylindrical member having an inner surface boundary 42 and an outer surface boundary 44 defining a sleeve volume 46 there between. The outer surface boundary 44 can be coaxial with the inner surface boundary 42. Moreover, in some embodiments, the sleeve volume 46 can comprise a plurality of discrete chambers 48 radially disposed about inner member sleeve 40. Each of the plurality of discrete chambers 48 can be separated from an adjacent discrete chamber 48 by a chamber wall 49. In this way, each of the plurality of discrete chambers 48 can be generally, but not exactly, isosceles trapezoids (although the base surfaces are defined by the radius of inner surface boundary 42 and outer surface boundary 44).

Inner surface boundary 42 and outer surface boundary 44 of inner member sleeve 40 are each permeable to permit air to flow from annular volume 18 to a central core volume 50 within inner member sleeve 40. In this embodiment, the airflow flows both axially and radially—that is, the air flows in a direction that is parallel to the longitudinal axis of outer member 14 and/or inner member sleeve 40 (i.e. axial) and will also flow in a radial direction as it passes from annular volume 18 to the central core volume 50. However, it should be understood that air can flow in an opposite direction from central core volume 50 to annular volume 18; however, this is also considered to be both axial and radial flows.

Permeability of inner surface boundary 42 and outer surface boundary 44 can be achieved according to any number of solutions providing a permeable feature 58. In some embodiments, permeable feature 58 can comprise a plurality of through-holes 52 formed in inner surface boundary 42 and outer surface boundary 44. Likewise, permeable feature 58 can comprise slots, material porosity, or other features that can be used to permit flow of air there through, thereby producing permeability.

With continued reference to FIGS. 2A-3, in some embodiments, one or more rod electrodes 54, coupled to a power source 55, can be disposed within one or more of the plurality of discrete chambers 48 and dielectric material 56 can be disposed within the associated discrete chamber 48 surrounding the rod electrode 54. It should be appreciated that the dielectric material 56 can comprise dielectric beads having an external diameter that is greater than the associated permeable feature 58 of inner surface boundary 42 and outer surface boundary 44 to ensure that dielectric beads 56 remain within each of the discrete chambers 48. Moreover, end cap member(s) 60 can be disposed on the longitudinal ends of each discrete chamber 48.

In some embodiments, as illustrated in FIG. 4, the chamber walls 49 separating each of the plurality of discrete chambers 48 can comprise a corresponding electrode 62 and dielectric layer 64. More particularly, each chamber wall 49 can comprise a central electrode layer 62 that is sandwiched on opposing sides by a pair of dielectric layers 64—the pair of dielectric layers 64 can be coupled to central electrode layer 62 via an adhesive or other suitable means. Electrode layer 62 is coupled to the power source 55. In this way, power source 55 can employ one or more electrical discharges between each rod electrode 54 and electrode layer 62 of chamber wall 49 that results in a non-thermal plasma generated within sleeve volume 46 of inner sleeve member 40.

As airflow passes between annular volume 18 and central core volume 50, the airflow is exposed to the non-thermal plasma within sleeve volume 46 according to the principles of the present teachings.

In this way, the distance between rod electrode 54 and electrode layer 62 of chamber wall 49 can be decreased to promote operation of the non-thermal plasmas within sleeve volume 46 without substantially effecting or increasing airflow resistance within annular volume 18 and/or central core volume 50. Moreover, the non-thermal plasma can be used to effectively and efficiently destroy chemical contaminants and/or inactivate and/or render non-infective biological pathogens within the airflow.

In some embodiments, a longitudinal length of outer member 14 and inner member 16 (or inner member sleeve 40) can be different from each other. For example, in some embodiments as illustrated in FIGS. 2A-3, inner member 16/inner member sleeve 40 can have a length that is less than the length of outer member 14. Accordingly, barrier members 60 can be used to facilitate airflow by providing blocking surfaces that force airflow between annular volume 18 and central core volume 50.

As should be appreciated from FIGS. 2A-3, as airflow enters annular volume 18 from central core volume 50 (or vice versa), the air is exposed to the plasma as it traverses sleeve volume 46. In this way, a much larger flow area is presented (reducing flow restriction and differential pressure) while allowing for a very narrow region that promotes plasma formation. Further, as ozone production generally scales with the surface area over which the discharge is maintained, far less discharge area is used in this configuration than in conventional designs leading to reduced ozone concentrations in the airflow.

It should be understood that alternative configurations are envisioned, including, but not limited to, employing a dielectric coating upon inner member 16 and/or outer member 14 to facilitate production of the plasma without the use of dielectric beads and/or an inner member sleeve 40.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A non-thermal plasma reactor system comprising:
   an outer member;
   a non-thermal plasma inner member sleeve disposed within the outer member, the non-thermal plasma inner member sleeve defining a central core volume, the non-thermal plasma inner member sleeve being dimensionally smaller than the outer member to define an annular volume between the non-thermal plasma inner member sleeve and the outer member, the non-thermal plasma inner member sleeve having an inner surface boundary and an outer surface boundary, the inner surface boundary being coaxial with the outer surface boundary to define a sleeve volume there between, the inner surface boundary and the outer surface boundary being permeable and configured to permit airflow between the annular volume and the central core volume;
   dielectric material being disposed within the sleeve volume; and
   a plurality of first electrode rods extending within the sleeve volume and at least a second electrode coupled to the inner member sleeve, the plurality of first electrode rods and the second electrode configured to exert electrical potential to produce a non-thermal plasma within the sleeve volume, the non-thermal plasma contacting the airflow as it flows through the sleeve volume between the annular volume and the central core volume.

2. The non-thermal plasma reactor system according to claim 1 wherein the sleeve volume between the inner surface boundary and the outer surface boundary of the non-thermal plasma inner member sleeve comprises a plurality of discrete chambers with a respective one of the plurality of first electrode rods disposed in each of the plurality of discrete chambers.

3. The non-thermal plasma reactor system according to claim 2 wherein the plurality of discrete chambers are radially disposed about the non-thermal plasma inner member sleeve.

4. The non-thermal plasma reactor system according to claim 2 wherein each of the plurality of discrete chambers is separated from adjacent ones of the plurality of discrete chambers by a chamber wall.

5. The non-thermal plasma reactor system according to claim 1 wherein the dielectric material comprises dielectric beads.

6. The non-thermal plasma reactor system according to claim 1 wherein the dielectric material comprises a dielectric coating.

7. The non-thermal plasma reactor system according to claim 1 wherein the permeable inner surface boundary and the permeable outer surface boundary each comprises a plurality of apertures formed therein.

8. The non-thermal plasma reactor system according to claim 7 wherein the plurality of apertures comprises a plurality of slots.

9. The non-thermal plasma reactor system according to claim 7 wherein the dielectric material comprises dielectric beads, the diameter of the dielectric beads being larger than the plurality of apertures formed in the permeable inner surface boundary and the permeable outer surface boundary.

10. The non-thermal plasma reactor system according to claim 1 wherein a size of the dielectric material is sufficient to be contained within the sleeve volume.

\* \* \* \* \*